United States Patent [19]

Lacey

[11] 4,431,234
[45] Feb. 14, 1984

[54] VEHICLE PASSENGER RESTRAINT

[76] Inventor: Charles W. Lacey, 561 Hudson St., New York, N.Y. 10014

[21] Appl. No.: 279,233

[22] Filed: Jun. 30, 1981

[51] Int. Cl.³ .............................................. B60R 21/00
[52] U.S. Cl. .................................... 297/484; 297/183; 297/466
[58] Field of Search ............... 297/464, 466, 486, 484, 297/483, 183

[56] References Cited

U.S. PATENT DOCUMENTS

| 127,578 | 6/1872 | Cozzens | 297/486 X |
| 148,380 | 3/1874 | Perrenet | 297/484 X |
| 951,560 | 3/1910 | Eaton | 297/484 X |
| 1,104,150 | 7/1914 | Staab et al. | 297/484 |
| 2,956,541 | 10/1960 | Rall | 297/484 X |
| 3,371,942 | 3/1968 | Buck et al. | 297/484 X |
| 3,829,158 | 8/1974 | O'Connor | 297/486 |
| 4,054,319 | 10/1977 | Fogg, Jr. et al. | 297/466 |

FOREIGN PATENT DOCUMENTS 26378 of 1913 United Kingdom ................ 297/183
240529 10/1925 United Kingdom ................ 297/183

*Primary Examiner*—James T. McCall
*Attorney, Agent, or Firm*—B. P. Fishburne, Jr.

[57] ABSTRACT

To comfortably and safely restrain the individual occupants of a vehicle, a pair of arm reeceiving, shoulder engaging restraint loops are anchored permanently or removably to opposite sides of each vehicle seat at a proper height to be engaged conveniently by occupants of various sizes. The occupant can slip his or her arms into and out of the restraint loops upon entering and exiting the vehicle with no inconvenience, no disturbing of the clothing and without operating buckles, straps or other fasteners. Coacting restraint hand grips may be provided on each seat in some cases for added safety.

9 Claims, 8 Drawing Figures

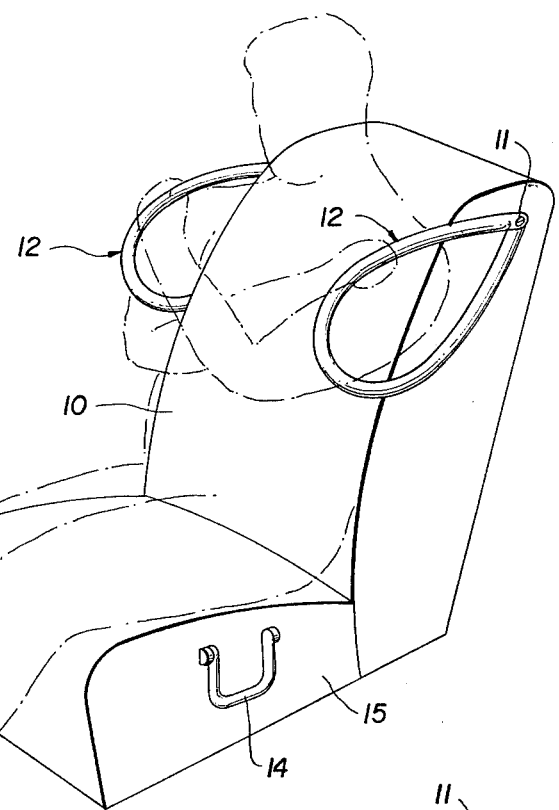
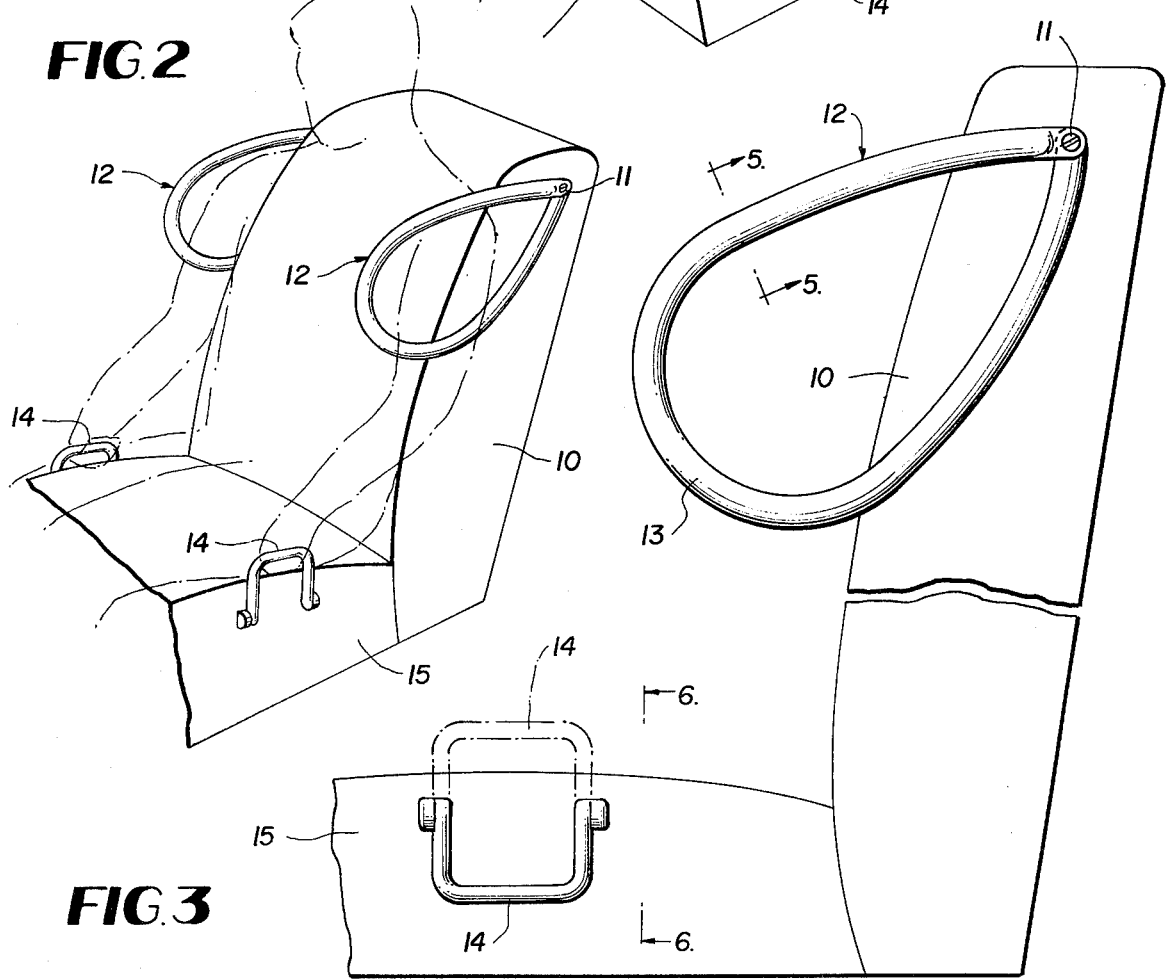

VEHICLE PASSENGER RESTRAINT

BACKGROUND OF THE INVENTION

A controversy has continued to rage in this country and abroad for a number of years over how best to provide a safe and effective restraint system for automotive vehicle passengers. Lap belts having adjustable release buckles and, more recently, shoulder and chest restraints having release buckles are the most widely employed devices furnished by automobile manufacturers. In spite of much advertising and urgings by safety officials, comparatively few people utilize these existing restraints because of the inconvenience of applying them to the body, adjusting and releasing the restraint upon exiting the vehicle. There is also objection to lap and shoulder belts based on disturbing and sometimes damaging the clothing of the user. More importantly, many people have resisted the use of conventional restraints out of fear of being trapped in the vehicle by them following a crash, as where the occupant is rendered unconscious or partly conscious.

In an effort to deal with the problem, many other passive and active restraint systems have been proposed in the prior art including inflatable air bags and bar devices which move automatically to restraining positions when the occupant seats himself in the vehicle. These more sophisticated systems generally have been rejected because of excessive cost of manufacturing and installation, and because of public resistance to the unknown. Because of all of these factors, the basic problem of providing an adequate and safe restraint and one which will meet with public acceptance and universal usage remains unsolved. Accordingly, the objective of this invention is to offer a very simple and economical solution to the problem through the provision of an individual passenger restraint which can be permanently or temporarily attached to a vehicle seat back at the proper elevation to enable the passenger to slip into the restraint when seating himself or herself and to slip out of it when leaving the vehicle without manipulating any buckle or other hardware, without subjecting the passenger to inconvenience and without disturbing the clothing. The restraint, according to the invention, is comfortable, effective and fits all sizes of adults and larger children without the need for basic adjustment on the seat back.

All of the above is accomplished in the invention through provision on the seat back at opposite sides thereof of a pair of arm receiving restraint loops which engage the shoulders of the seat occupant to restrain forward movement and/or side movement in a sudden stop or collision. The user of the restraint system slips his or her arms into and out of the provided loops at the time of seating or exiting the vehicle without using the hands, much in the manner that one slips into or out of a jacket which is being supported by another person.

The invention possesses other features which will become apparent to those skilled in the art during the course of the following detailed description.

BRIEF DESCRIPTION OF THE DRAWINGS

FIG. 1 is a perspective view of a vehicle passenger restraint system according to the invention in one mode of use.

FIG. 2 is a similar view of the restraint system in a different mode of use.

FIG. 3 is an enlarged side elevation of the invention.

DETAILED DESCRIPTION

Figure 7:
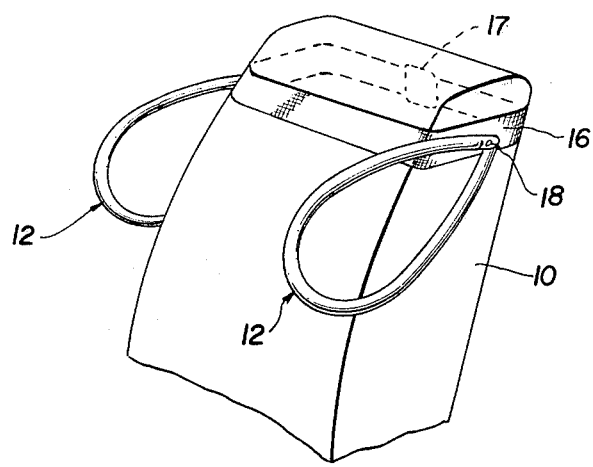
FIG. 7 is a fragmentary perspective view showing an alternate embodiment of the invention.
Figure 4:
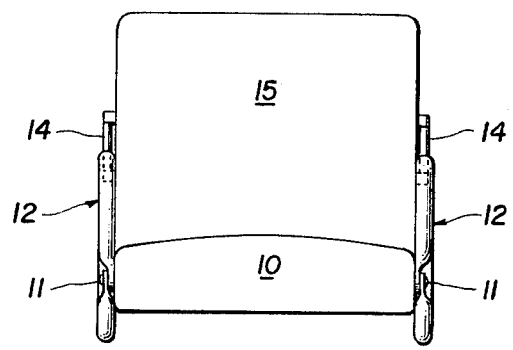
FIG. 4 is a plan view thereof.
Figure 5:
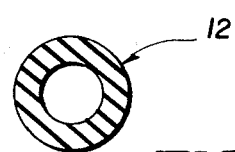
FIG. 5 is an enlarged cross sectional view taken on line 5—5 of FIG. 3.
Figure 6:
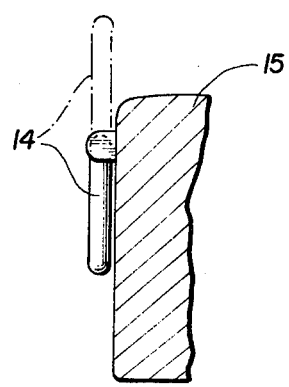
FIG. 6 is a fragmentary vertical section taken on line 6—6 of FIG. 3.

Referring to the drawings in detail wherein like numerals designate like parts, the back 10 of each passenger seat may have permanently attached to the opposite sides thereof by secure anchor bolts 11, or equivalent means, a pair of restraint loops 12 forming the main subject matter of the invention. These loops can be conveniently and economically formed from sections of semi-rigid plastics tubing such as vinyl tubing or the like. In a practical embodiment of the invention and to promote comfort for the user, the tubing has an outside diameter of approximately $\frac{3}{4}$ inch and a wall thickness of about $\frac{1}{8}$ inch. These dimensions are not critical and may be varied.

When the length of tubing is formed into the loop 12, the loop is elongated and includes an approximately semi-circular forward shoulder engaging portion 13 preferably measuring about 7 inches in internal diameter. The internal length of the loop between the bolt 11 and portion 13 preferably measures about 12 inches. The sides of the loop 12 converge toward the anchor bolt 11 and meet at this point to receive the anchor bolt, as shown. The loop thus assumes a modified elliptical or teardrop configuration. It is semi-rigid and yields readily in response to external forces.

The size of the loop is chosen to receive the arms and shoulders of adults and larger children through a wide range of sizes. The yieldability of the loops helps in enabling them to conform properly to large and small users. More importantly, the loops 12 are individually swingable in vertical arcs around the axes of anchor bolts 11. This adjustability feature enables users of various sizes and builds to quickly and conveniently slip into and out of the restraint, and the latter will adjust itself automatically to the height of the seated user in the vehicle as well as to the girth of the arms and shoulders due to the pliability of the loops 12.

When entering a vehicle equipped with the restraint system, the user simply slips his or her arms through the two loops 12 in much the same manner that one would slip into a coat being held by another. On exiting the vehicle, the user with equal convenience can slip out of the two loops 12. There are no buckles or other hardware which must be manipulated by the hands when entering or leaving the restraint system, and the hands need not be employed at all for this purpose.

During a collision or sudden stop, the restraint system affords primary restraint against direct forward motion as well as lateral restraint. As shown in FIG. 1, a passenger of the vehicle, when sensing an impending impact, may cross his or her arms in front of the chest and with the hands grasp and securely hold onto the restraint loops 12 at the critical moment. This stabilizes the body of the passenger as well as the two loops 12, enabling them to work most efficiently in holding the passenger in an upright position during the crash or abrupt stop. Even if a passenger does not resort to this preferred crossed arm mode of use of the restraint system shown in FIG. 1, the system is still very effective in preventing forward and/or lateral displacement of the passenger in a crash or upset.

In lieu of the mode of use shown in FIG. 1, an alternate mode of use is depicted in FIG. 2. To facilitate this alternate mode of use, a pair of hinged hand grips 14 are provided on each side wall of each seat bottom 15. Each passenger except the driver of the vehicle may grasp the hand grips 14 if a crash appears imminent or during high speed maneuvering as in an emergency. Such grasping will stabilize the arms and shoulders with relation to the two restraint loops 12 which are in substantially vertical parallel planes, whereby, at the moment of impact, the arms and shoulders are comparatively rigid and the restraint loops will function with maximum effectiveness.

For added strength, if desired, a cable, not shown, may be placed inside of each tubular loop 12. Other passenger stabilizing means, not shown, may be employed in some cases. For example, a seat anchored loop rising between the legs of a passenger may receive therethrough a rigid bar placed across the tops of the thighs to lock the occupant to the seat bottom 15. Such coacting devices can be omitted and the loops 12 along will form a very adequate, safe, convenient and efficient restraint system free of the aforementioned drawbacks of the prior art.

Figure 8:
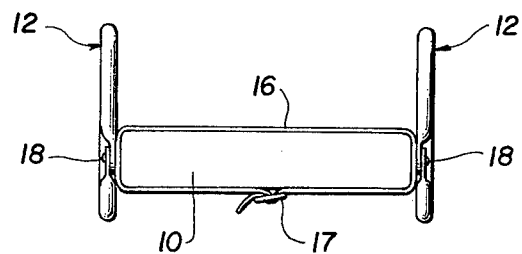
FIG. 8 is a plan view of the alternate embodiment.

FIGS. 7 and 8 show an alternate embodiment of the invention wherein the described restraint loops 12 are removably attached to each seat back 10 by an adjustable belt 16 having a buckle 17 or the like. The belt is applied around the seat back at the proper elevation, and the restraint loops 12 are securely anchored to the belt 16 by suitable fasteners 18, such as bolts or strong rivets. The mode of operation of the invention under either described embodiment is the same.

The invention as described is most ideally suited to the latest types of passenger vehicles adapted to carry four passengers in individualized seats. Such smaller automobiles are becoming standard throughout the world. However the invention is also adaptable to the larger five and six passenger automobiles having bench seats. In such cases, the innermost restraint loops 12 of each pair can be tethered to the seat backs by short cables whereby the inner loops may hang down over the rear sides of the seat backs 10 when not in use.

It is to be understood that the forms of the invention herewith shown and described are to be taken as preferred examples of the same, and that various changes in the shape, size and arrangement of parts may be resorted to, without departing from the spirit of the invention or scope of the subjoined claims.

I claim:

1. A vehicle passenger safety restraint comprising in combination with a passenger seat back having spaced substantially vertical side walls, a pair of separated unconnected independently operable restraint loops formed of stiff but somewhat yielding and conformable material, said loops tapering toward one of their corresponding ends, means pivotally anchoring the tapering corresponding ends of said loops to said vehicle seat back vertical side walls near the tops of the latter, whereby the loops are independently swingable in substantially vertical planes forwardly and rearwardly across said side walls in planes substantially parallel thereto on the axis of said means, and the corresponding ends of said loops away from said means being enlarged and rounded so that the arms of a passenger can be placed therethrough forwardly of the seat back with the loops engaging the forward side of a passenger's shoulders to restrain the passenger, the restraint loops being disposed at least in part forwardly of the seat back when in the operative restraint position and being independently self-adjusting pivotally on the axis of said means to accommodate individual passenger shoulder anatomy variations.

2. A vehicle passenger safety restraint as defined in claim 1, and the loops being formed of tubing material.

3. A vehicle passenger safety restraint as defined in claim 2, and the tubing material comprising tough yielding plastics tubing of circular cross section having an outside diameter of roughly three-fourths inch.

4. A vehicle passenger safety restraint as defined in claim 1, and cooperative auxiliary hand grips anchored near opposite sides of a vehicle passenger seat forwardly of said seat back and being approximately in common vertical planes with the seat back side walls and said loops.

5. A vehicle passenger safety restraint as defined in claim 1, and said means comprising rigid anchoring pivot shaft means directly mounted on the seat back.

6. A vehicle passenger safety restraint as defined in claim 1, and said means comprising a pair of pivot elements connected one each with the tapering ends of the loops and pivotally supporting the loops independently, and an adjustable belt carrying said pivot elements and being adapted to surround and snugly embrace a passenger seat back at a selected height thereon.

7. A vehicle passenger safety restraint consisting solely and entirely of a pair of laterally spaced separately formed and independently operable passenger shoulder restraint loops disposed in free-swinging relationship in substantially vertical planes adjacent to the opposite side walls of a passenger seat back, means pivotally anchoring corresponding ends of said restraint loops to said seat back side walls substantially above the seating surface of the passenger seat, whereby said restraint loops are independently swingable forwardly and rearwardly and upwardly and downwardly on the axis of said means to render them self-adjusting with relation to the arms and shoulders of passengers using said safety restraint.

8. A vehicle passenger safety restraint as defined in claim 7, and the restraint loops having forward relatively wide arcuate ends connected by side portions which converge rearwardly and meet at said means.

9. A vehicle passenger safety restraint as defined in claim 8, and the loops being formed of bent sections of stiff somewhat yielding and conformable circular cross section material.

* * * * *